(12) United States Patent
Söderberg et al.

(10) Patent No.: US 6,725,146 B2
(45) Date of Patent: Apr. 20, 2004

(54) BRAKING DEVICE FOR A SELF-PROPELLED ROLLER

(75) Inventors: Bengt Söderberg, Twing (SE); Gilbert Erlandsson, Röderby (SE)

(73) Assignee: Metso Dynapac AB, Karlskrona (SE)

( * ) Notice: Subject to any disclaimer, the term of this patent is extended or adjusted under 35 U.S.C. 154(b) by 0 days.

(21) Appl. No.: 10/320,452

(22) Filed: Dec. 17, 2002

(65) Prior Publication Data

US 2003/0114976 A1 Jun. 19, 2003

(30) Foreign Application Priority Data

Dec. 18, 2001 (SE) .............................................. 0104278

(51) Int. Cl.$^7$ .............................. B60T 7/00; B60T 13/00
(52) U.S. Cl. ......................................... 701/70; 701/71
(58) Field of Search .................... 701/70, 71; 188/1.12, 188/2 R, 24.14

(56) References Cited

U.S. PATENT DOCUMENTS 4,324,387 A * 4/1982 Steinhagen ................. 254/310
5,595,121 A * 1/1997 Elliott et al. .................. 104/53
5,983,149 A 11/1999 Tate et al.
6,240,356 B1 5/2001 Lapke

FOREIGN PATENT DOCUMENTS

DE        003526254 A1 * 10/1986
GB        2 033 511       5/1980

* cited by examiner

Primary Examiner—Yonel Beaulieu
(74) Attorney, Agent, or Firm—Walter Ottesen

(57) ABSTRACT

A secondary braking device for a self-propelled diesel-driven roller (1) is especially for a vibrating roller that is operated on steep downgrades only on rare occasion. The roller (1) is equipped with an electronic engine control module (2) that is programmed so as to, when a preset primary diesel engine speed is exceeded, connect to ground an actuator relay (4) for a hydraulic valve (5) in the hydraulic system (6) of the roller. The hydraulic valve is thereby caused to interrupt the hydraulic supply pressure to one or a plurality of drum brakes (8). The drum brakes (8) generate maximum braking force upon the loss of supply pressure.

4 Claims, 1 Drawing Sheet

BRAKING DEVICE FOR A SELF-PROPELLED ROLLER

FIELD OF THE INVENTION

The invention relates to a secondary braking device for a self-propelled diesel-driven roller, particularly a vibrating roller that is operated on steep downgrades only on rare occasion, and is equipped with an electronic engine control module which is programmed so as to, when a preset programmed primary diesel engine speed is exceeded, connect to ground an actuator relay on a hydraulic valve in the hydraulic system of the roller. The grounding of this actuator relay causes an interruption of the hydraulic supply pressure to one or a plurality of drum brakes, which generate maximum braking force upon the loss of the supply pressure.

BACKGROUND OF THE INVENTION

In braking devices for work vehicles, such as disclosed in U.S. Pat. No. 5,983,149, the braking device is designed for frequent operation on steep downgrades, and with a varying total vehicle weight. These operating conditions have resulted in the need for a proportional braking force with an advanced control system that takes into account a number of parameters in addition to the engine speed. The system is unnecessarily complicated for a vibrating roller that is operated on steep downgrades only on rare occasion, and always at a known total weight. The primary brake system in cooperation with the internal friction of the propelling machinery and mass-moment of inertia have provided sufficient braking force in connection with the operation of prior art rollers on steep downgrades. Advancements in diesel engines have led roller manufacturers to equip their rollers with more efficient diesel engines, which are often of smaller displacement and exhibit lower internal friction. The reduction in braking force thus created results in harmful overspeeding of the propulsion machinery and exposes the roller operator to danger.

SUMMARY OF THE INVENTION

It is an object of the invention to eliminate the need for complicated prior art brake-control devices and to provide a secondary braking device that: actively engages when external circumstances tend to overspeed the propulsion machinery; uses the components of known rollers more efficiently; includes a suitable and simple control system and entails the addition of only a small number of new components.

BRIEF DESCRIPTION OF THE DRAWING

The invention will be described in detail with reference to the single FIGURE (FIG. 1), which shows, in side elevation, a double-drum roller. A schematic representation of the hydraulic circuit of the secondary braking system in its passive mode is also shown, that is, when the ground is disconnected and the supply pressure is present at the drum brakes so that the latter are disengaged.

DESCRIPTION OF THE PREFERRED EMBODIMENTS OF THE INVENTION

Figure 1:
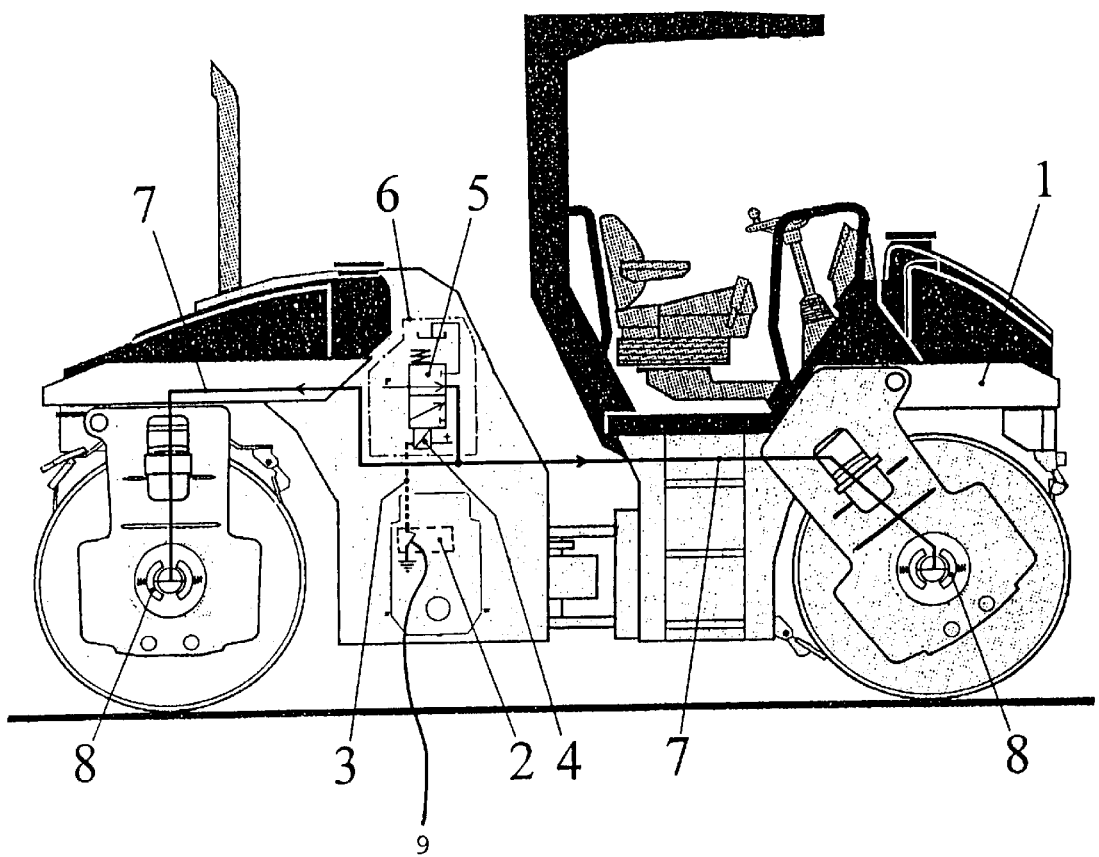

In FIG. 1, the electronic engine control module (ECM) 2 of the roller 1 is arranged to control the functions of the diesel engine. The ECM is programmed to connect to ground, via the wire 3 and switch 9, the actuator relay 4 for the hydraulic valve 5 in the hydraulic system 6 of the roller when the speed of the diesel engine exceeds a set maximum value, such as 2700 rpm. This happens, for example, when the roller is moving downhill and the engine is operating in overrun.

When the actuator relay 4 is switched to ground via switch 9 being switched closed, the hydraulic valve 5 is actuated to shut off the hydraulic supply pressure to the hydraulic drum brakes 8 of the roller by interrupting pressure supply in hydraulic line 7. The drum brakes 8 generate a full braking force upon the loss of the supply pressure. The increased braking force provided by the activated drum brakes reduces the diesel engine speed until a second speed value programmed into the ECM is undershot, for example, 2500 rpm. The ECM is programmed to interrupt the connection to ground via switch 9 when this lower speed is undershot. This causes, in reverse sequence, the secondary braking device to release the drum brakes 8.

In the event that the engine speed increases again to exceed the maximum value, the governing secondary braking device will repeat this procedure continuously.

The secondary braking device also functions as a parking brake when the engine is switched off. This is so because pressure is then no longer generated in the hydraulic systems and the drum brakes 8 apply their braking force to the rollers.

The invention is also applicable to other types of braking arrangements in which, for example, the actuator relay 4 for the hydraulic valve 5 must be connected to electrical current in order for the hydraulic supply pressure to the drum brakes to be interrupted.

It is understood that the foregoing description is that of the preferred embodiments of the invention and that various changes and modifications may be made thereto without departing from the spirit and scope of the invention as defined in the appended claims.

What is claimed is:

1. A braking device for a self-propelled roller having a front roller and a rear roller and having an internal combustion engine and an engine control module for controlling the operation of the engine, the braking device comprising:

a hydraulic unit for generating a hydraulic supply pressure;

a drum brake for applying a braking force to at least one of said rollers when said supply pressure is interrupted and for discontinuing the application of said braking force when said supply pressure is present;

a hydraulic line connecting said hydraulic unit to said drum brake for conducting fluid thereto under said supply pressure;

a hydraulic valve connected into said line and switchable between a first position wherein said hydraulic unit is connected to said drum brake so that said supply pressure is present at said drum brake and a second position wherein said supply pressure to said drum brake is interrupted;

an actuator relay connected to said hydraulic valve for actuating said hydraulic valve between said first and second positions;

said actuator relay actuating said hydraulic valve into said second position when said actuating relay is connected to ground;

said engine control module being programmed to emit an output signal when said engine speed reaches a speed greater than a predetermined upper limit; and, switching means for switching said actuating relay to ground in response to said output signal whereby said hydraulic valve assumes said second position thereby interrupting said supply pressure to said drum brake and causing said drum brake to assumes said second position thereby interrupting said supply pressure to said drum brake and causing said drum brake to generate said braking force to brake said self-propelled vehicle.

2. The braking device of claim 1, wherein said engine control module is also programmed to disable said output signal when said engine speed drops below a predetermined lower limit thereby causing said actuator relay to energize and cause said hydraulic valve to assume said first position thereby returning said supply pressure to said drum brake and causing said drum brake to discontinue the application of said braking force.

3. The braking device of claim 2, wherein said lower limit is 200 rpm less than said upper limit.

4. The braking device of claim 1, wherein said upper limit is equal to or less than 2,700 rpm.

* * * * *